United States Patent [19]

Morningstar

[11] 3,849,179

[45] Nov. 19, 1974

[54] INTERNALLY COATED REACTION VESSEL AND PROCESS FOR COATING THE SAME

[75] Inventor: Marion G. Morningstar, Avon Lake, Ohio

[73] Assignee: The B. F. Goodrich Company, New York, N.Y.

[22] Filed: Aug. 27, 1973

[21] Appl. No.: 391,880

[52] U.S. Cl..................... 117/97, 23/252 A, 23/285, 106/15 AF, 117/124 E, 117/132 R, 117/161 UA, 260/2 EN, 260/29.2 N, 260/92.8 W
[51] Int. Cl......... C08f 1/98, C08f 3/30, C23f 14/02
[58] Field of Search...... 117/161 UA, 124 E, 132 B, 117/132 C, 132 R, 97; 23/252 A, 285; 106/15 AF; 260/2 EN, 29.2 N, 92.8 W

[56] References Cited
UNITED STATES PATENTS

| | | | |
|---|---|---|---|
| 2,272,489 | 2/1942 | Ulrich | 260/2 EN |
| 2,348,039 | 5/1944 | Ulrich et al. | 117/161 UA |
| 2,381,020 | 8/1945 | Wilkes | 117/161 UA |
| 3,236,688 | 2/1966 | Kahn | 117/97 X |
| 3,279,889 | 10/1966 | Rychly | 23/252 A |
| 3,282,851 | 11/1966 | Muehlberg | 260/29.2 N |
| 3,288,640 | 11/1966 | Flock | 260/2 EN |
| 3,294,723 | 12/1966 | Goldstein et al. | 260/2 EN |
| 3,471,359 | 10/1969 | Goldstein | 117/75 X |
| 3,515,709 | 6/1970 | Nelson | 260/92.8 W |
| 3,529,026 | 9/1970 | Blumcke | 23/252 A |
| 3,541,045 | 11/1970 | Jabloner | 260/21 EN X |
| 3,562,238 | 2/1971 | Parks | 260/92.8 W |
| 3,738,974 | 6/1973 | Takehisa | 23/285 X |
| 3,757,001 | 9/1973 | Reiter et al. | 260/92.8 W |
| 3,778,423 | 12/1973 | Reiter | 260/92.8 W |

*Primary Examiner*—Ralph S. Kendall
*Assistant Examiner*—Dennis L. Albrecht
*Attorney, Agent, or Firm*—Roy P. Wymbs

[57] ABSTRACT

A reaction vessel having on the internal surfaces thereof a coating containing, as a primary ingredient, polyethyleneimine, which is applied to said surfaces from an aqueous solution. The coating may also contain a curing agent, such as formaldehyde, as well as a water phase polymerization inhibitor. Also included is the process for coating said internal surfaces whereby polymer build-up on said surfaces is substantially decreased.

12 Claims, No Drawings

INTERNALLY COATED REACTION VESSEL AND PROCESS FOR COATING THE SAME

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "build-up," of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal

group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer build-up must be removed since it results in further formation of polymer build-up on the reactor surfaces which results in a crust that adversely affects heat transfer and contaminates the polymer being produced.

The nature of the polymer build-up insoluble incoluble deposit on the walls of the reactor is such that in the commercial production of polymers, as described above, it has in the past been standard practice, after each polymerization reaction is completed, to have an operator enter the reactor and scrape the polymer build-up off the walls and off the baffles and agitator. An operation such as this is not only costly, both in labor and down-time of the reactor, but presents potential health hazards as well. While various methods have heretofore been proposed to reduce the amount and nature of polymer build-up on polymerization reactor surfaces, such as solvent cleaning, various hydraulic and mechanical reactor cleaners, and the like, none has proved to be the ultimate in polymer build-up removal. That is to say, these various methods and apparatus have done an acceptable job, but there is still room for improvement in this area, particularly from an economic point of view.

SUMMARY OF THE INVENTION

It has been found that if a reactor has been previously coated on the interior surfaces with the proper coating, undesirable polymer build-up on said surfaces can be substantially decreased, and in some cases entirely eliminated. I have unexpectedly found that when the interior surfaces of a reactor are covered with a coating containing, as a primary ingredient, polyethyleneimine, with or without the addition thereto of a curing agent and/or a water phase polymerization inhibitor, polymer build-up on the said surfaces of the reactor is essentially eliminated. Due to the water solubility of polyethyleneimine, the coating is very easily applied from an aqueous solution.

DETAILED DESCRIPTION

In accordance with the present invention, a polymeric film or coating of polyethyleneimine is applied to the interior surfaces of the polymerization reactor wherein suspension polymerization reaction are carried out. Likewise, all exposed surfaces on the interior of the reactor, such as the baffles, agitator, and the like, are also coated in like manner. The coating thus applied is readily cured or insolubilized by the use of heat or a curing or cross-linking agent, as hereinafter more fully described. The polymeric coating of polyethyleneimine is hydrophilic in nature and, accordingly, is wet by water, or absorbs water, without peeling off or blistering. The polymeric coating retains its hydrophillicity even though insolubilized. The hydrophilic polymer coating thus provides a water layer, so to speak, on the interior surfaces and repels the monomer or monomers being polymerized and preventing the creation of sites for the build-up of polymer thereon.

The polyethyleneimine polymer coating is made by conventional methods, using heat and agitation where necessary. The polymer is dissolved in water to give a solution that has a viscosity such that it can be sprayed or brushed on the reactor surfaces, such as in the case of paint. Usually a coating solution having a solids content in the range of about 5 to about 20 percent by weight is satisfactory. In addition to curing agents, additives may be employed in the coating, if desired, such as polymerization inhibitors, plasticizers, dyes, fillers or pigments, and the like.

After application of the coating to the surfaces to be protected, the coating, or polymer, is cured or set in order to insolubilize the same. The polymer may be cured by heating by any suitable means, such as by the use of heaters positioned internally of the reactor, or radiant heating, by pumping heated air or other gas through the reactor, and the like. Also, one may reflux solvents in the reactor in which the coating is insoluble and which reflux at a temperature in the desired range. When heat curing, usually a temperature in the range of 100°C. to 140°C. is sufficient. However, a more preferred method of curing or insolubilizing the polymeric coating is by incorporation into the polymeric coating of a curing or cross-linking agent. Such agent may be mixed into the coating solution prior to application or it may be applied after the polymeric coating is applied as a second or top coating. In either case, upon the application of heat, cross-linking or curing of the polyethyleneimine occurs. The heat required in this operation is not as great as that necessary in the absence of a curing agent. Usually, a temperature in the range of about 70°C. to about 120°C. is satisfactory. Among the various curing agents that may be employed in the practice of the present invention there may be named ethylene dichloride, urea, formaldehyde, and other aldehydes such as glyoxal, acetaldehyde, paraformaldehyde, and the like; acid anhydrides, such as acetic anhydride, phthalic pathalic anhydride, maleic anhydride, and the like; diisocyanates, such as methylene diisocyanate, tolylene diisocyanate, and so forth. Particularly useful, from a practical and economic point of view, is formaldehyde.

I have further found that the effectiveness of the polymeric coatings of the instant invention in reducing polymer build-up on reactor surfaces can be still further enhanced by the incorporation in the coating, prior to application, of a water-soluble, water-phase polymerization inhibitor. For this purpose, I have found that the most useful compounds are the water-soluble divalent tin salts. Among such suitable salts that may be so employed are stannous chloride, stannous fluoride, stannous bromide, stannous sulfate, stannous nitrate, and the like. When employing an inhibitor, as aforesaid, usually an amount in the coating solution of about 0.1 percent to about 5.0 percent by weight, based on the total weight of the coating solution, is sufficient.

While the coating is prepared as an aqueous solution, after application and curing the coating becomes insoluble in water or is insolubilized. This is necessary since the coating must not only be insoluble in the reaction mixture, but also it is necessary that the coating should remain substantially chemically unaffected in the presence of the components of the reaction, that is, it should be substantially inert under the reaction conditions.

As previously pointed out, the coating may be applied to the interior surfaces of the reaction vessel in any convenient manner, such as spraying, brushing on, and the like. Brushing has been found to be efficient since it insures complete coverage of all surfaces. Any uncovered areas, such as pinholes, etc., should be avoided since such exposed areas provide sites for polymer build-up. If desired, more than one application or layer of the coating may be used. In many instances, depending upon the condition of the surface being coated, plural layers are desirable since complete coverage is thereby insured. In this regard, it should be noted that for best results the surface being coated should be as clean and smooth as possible. In this case of metal surfaces, cleaning by acid etching or abrading is satisfactory.

The amount of coating applied, or the thickness thereof, is not particularly critical. However, for economic reasons, as thin a coating as possible should be applied to the surfaces to be protected but still insuring complete coverage. Again, it should be borne in mind that in addition to coating the interior surfaces or walls of the reaction vessel, all other parts therein should likewise be coated, such as baffles, agitator shaft and blades, heating coils, temperature probes, and the like. Suffice it to say that a sufficient amount of coating should be employed to obtain a continuous film over all interior surfaces of the reaction vessel with no areas of said surfaces remaining unprotected.

After application and curing of the coating on the interior surfaces of the reaction vessel, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein. Ordinary care should, of course, be exercised to avoid rough, physical contact with the coated surfaces because of the damage to the film which may result from such contacts.

While the present invention is specifically illustrated hereinafter with regard to the suspension polymerization of vinyl chloride, it is to be understood that the apparatus and process may likewise be applied in the dispersion or suspension polymerization of any polymerizable ethylenically unsaturated monomer or monomers where undesirable polymer build-up occurs. Examples of such monomers are other vinyl halides and vinylidene halides, such as vinyl bromide, vinylidene chloride, etc.; vinylidene monomers having at least one terminal

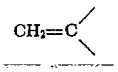

grouping, such as esters of acrylic acid, for example, methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; di-olefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers copolymerizable therewith in amounts as great as about 80 percent or more by weight, based on the weight of the monomer mixture, since polymer build-up in the reaction vessel is a particularly bad problem here.

The following specific example is set forth to more clearly define the present invention. It is to be understood, however, that this is merely intended in an illustrative and not a limitative sense. In the example, all parts and percents are by weight unless otherwise indicated.

In the example the following formulation was used in making the coating solution:

| | |
|---|---|
| 700 gms. | (24.8%) polyethyleneimine |
| 2,100 gms. | (74.5%) water (demineralized) |
| 19.6 gms. | (0.69%) formaldehyde |

The polyethyleneimine and formaldehyde were mixed in the water with agitation for 15 minutes at room temperature. The coating solution was then wiped on the internal surfaces of the polymerization reactor and steam run into the jacket of the reactor to dry and cure the coating. The temperature in the jacket was 100°C. and maintained for approximately 1 hour to insure complete cure or insolubilization.

In the polymerization reaction conducted in said coated reactor the following recipe was used:

| | |
|---|---|
| Vinyl chloride | 100 pts. (40 lb.) |
| Water (D.M.) | 182 pts. (72.8 lb.) |
| COVAL (88% hydrolyzed polyvinyl alcohol) | 0.10 pts. (18.2 gm.) |
| Secondary butyl percarbonate (20% solution in hexane) | 0.02 pt. (15.2 gm.) |

The reaction was carried out in the usual manner under a blanket of nitrogen and pressure with agitation. The temperature of polymerization was 56°C. and the reaction was continued until a substantial pressure drop occurred (approximately 4 hours) indicating that the reaction was complete. Thereafter the contents of the reactor were removed in usual fashion and the internal coated surfaces of the reactor were closely examined.

The coating was completely intact and essentially unchanged. Under 40X magnification no buildup was obvious. A few impingement particles of polymer could be seen but from all observations, this appeared to be associated with fingerprints on the coating made prior to the polymerization reaction.

When the same recipe, as given above, was polymerized under the same conditions in a reactor which had not been coated internally, the polymer buildup was very heavy ranging from ¼ inch to 1½ inches on the internal walls, stirrer blades and baffles. Obviously, the polyethyleneimine coating alleviates this difficulty.

Coating of the internal surfaces of the polymerization reactor in accordance with the present invention substantially reduces polymer build-up and thus results in increased production over a unit period of time. In those instances where a little polymer does accumulate on the interior surfaces, it is not of the difficult to remove hard rough type and is easily removed by rinsing without employing the difficult tedious scraping methods that are presently necessary in the art. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A process for substantially reducing the build-up of polymer on the internal surfaces of a reaction vessel used in the dispersion or emulsion polymerization of polymerizable ethylenically unsaturated monomers which comprises applying to said surfaces an aqueous coating solution comprised predominantly of polymeric polyethyleneimine and having a solids content of about 5 to about 20 percent by weight, and thereafter drying and curing said coating to insolubilize the same.

2. A process as defined in claim 1 wherein the coating contains as a curing agent a compound selected from the group consisting of ethylene dichloride, urea, aldehydes, acid anhydrides and diisocyanates, said curing agent being present in an amount sufficient to insolubilize said coating.

3. A process as defined in claim 2 wherein the curing agent is formaldehyde.

4. A process as defined in claim 1 wherein the coating contains from about 0.1 percent to about 5.0 percent by weight, based on the total weight of the coating solution, of a divalent tin salt as a water-soluble, water-phase polymerization inhibitor.

5. A process as defined in claim 2 wherein the coating contains from about 0.1 percent to about 5.0 percent by weight, based on the total weight of the coating solution, of a divalent tin salt as a water-soluble, water-phase polymerization inhibitor.

6. A process as defined in claim 5 wherein the coating contains formaldehyde and stannous chloride.

7. A polymerization reaction vessel having on the internal surfaces thereof an insolubilized protective hydrophilic coating comprised predominantly of polymeric polyethyleneimine deposited from an aqueous solution having a solids content of about 5 percent about 20 percent by weight, whereby polymer build-up on said internal surfaces is substantially reduced.

8. A polymerization reaction vessel as defined in claim 7 wherein said coating contains as a curing agent a compound selected from the group consisting of ethylene dichloride, urea, aldehydes, acid anhydrides, and diisocyanates, said curing agent being present in an amount sufficient to insolubilize said coating.

9. A polymerization reaction vessel as defined in claim 7 wherein the coating contains from about 0.1 percent to about 5.0 percent by weight, based on the total weight of the coating solution, of a divalent tin salt as a water-soluble, water-phase polymerization inhibitor.

10. A polymerization reaction vessel as defined in claim 8 wherein the curing agent is formaldehyde.

11. A polymerization reaction vessel as defined in claim 8 wherein the coating contains from about 0.1 percent to about 5.0 percent by weight, based on the total weight of the coating solution, of a divalent tin salt as a water-soluble, water-phase polymerization inhibitor.

12. A polymerization reaction vessel as defined in claim 11 wherein the coating contains formaldehyde and stannous chloride.

* * * * *